(12) United States Patent
Sreenivas et al.

(10) Patent No.: US 8,907,643 B2
(45) Date of Patent: Dec. 9, 2014

(54) POWER SUPPLY CIRCUITRY AND ADAPTIVE TRANSIENT CONTROL

(75) Inventors: Venkat Sreenivas, Winchester, MA (US); Robert T. Carroll, Andover, MA (US)

(73) Assignee: International Rectifier Corporation, El Segundo, CA (US)

( * ) Notice: Subject to any disclaimer, the term of this patent is extended or adjusted under 35 U.S.C. 154(b) by 340 days.

(21) Appl. No.: 13/396,495

(22) Filed: Feb. 14, 2012

(65) Prior Publication Data

US 2013/0119951 A1    May 16, 2013

Related U.S. Application Data

(60) Provisional application No. 61/560,125, filed on Nov. 15, 2011.

(51) Int. Cl.
| | |
|---|---|
| G05F 1/10 | (2006.01) |
| H02M 3/157 | (2006.01) |
| H02M 1/00 | (2006.01) |
| H02M 3/158 | (2006.01) |

(52) U.S. Cl.
CPC ...... *H02M 3/157* (2013.01); *H02M 2001/0012* (2013.01); *H02M 2003/1586* (2013.01)
USPC ....................................................... 323/273

(58) Field of Classification Search
CPC .............. H02M 3/16; G05F 1/10; G05F 1/59; G05F 1/575

USPC ................................... 323/271, 273, 282–284
See application file for complete search history.

(56) References Cited

U.S. PATENT DOCUMENTS

| | | | | |
|---|---|---|---|---|
| 7,301,488 | B2 * | 11/2007 | Leung et al. | 341/131 |
| 7,852,053 | B2 * | 12/2010 | Martin et al. | 323/272 |
| 2011/0210707 | A1 * | 9/2011 | Marsili et al. | 323/271 |

* cited by examiner

*Primary Examiner* — Adolf Berhane
*Assistant Examiner* — Yemane Mehari
(74) *Attorney, Agent, or Firm* — Chapin IP Law, LLC

(57) ABSTRACT

A power supply system includes a PID control circuit, a signal shaping circuit, and a PWM control circuit. The PID control circuit generates a signal based on an error voltage of the power supply system. The signal shaping circuit receives and converts the signal outputted from the PID control circuit into a linear control signal. To reduce cost, the shaping circuit can include a piecewise linear implementation. During non-transient load conditions, the PWM control circuit utilizes the linear control signal outputted from the signal shaping circuit to adjust a switching period of a power supply control signal. The switching period of the power supply control signal is maintained within a desired range. During transients, settings of the PID control circuit are modified to provide a faster response. The switching period of the power supply control signal may be adjusted outside of the desired frequency range.

23 Claims, 11 Drawing Sheets

POWER SUPPLY CIRCUITRY AND ADAPTIVE TRANSIENT CONTROL

RELATED APPLICATIONS

This application is related to and claims the benefit of earlier filed U.S. Provisional Patent Application Ser. No. 61/560,125 entitled "Digital Control Using Pulse Frequency Modulation," filed on Nov. 15, 2011, the entire teachings of which are incorporated herein by this reference.

BACKGROUND

Conventional multiphase interleaved VRM (Voltage Regulator Module) topologies typically include two or more power converters. The power converters can be operated in parallel with each other to power a corresponding load.

For example, a typical configuration of a conventional VRM such as a so-called synchronous buck converter includes one or more power converter phases. Each power converter phase can include an inductor, a high side switch, and a low side switch. A control circuit associated with the buck converter repeatedly pulses the high side switch ON to convey power from a power source through the one or more inductors in the phases to a dynamic load. The control circuitry repeatedly pulses the low side switch ON to provide a low impedance path from a node of the inductor to ground in order to prevent an over-voltage condition on an output of the buck converter. Thus, the energy stored in the inductor increases during a time when the high side switch is ON and decreases during a time when the low side switch is ON. During switching operation, the inductor transfers energy from the input to the output of the converter.

Conventional PID control circuitry has been implemented to generate signals to control one or more power converter phases. In general, a conventional PID control circuitry typically includes three separate constant parameters including a proportional value (e.g., P-component), an integral value (e.g., an I-component), and a derivative value (e.g., a D-component). The P-component indicates a present error; the I-component is an accumulation of past errors, and the D-component is a prediction of future errors. A weighted sum of these three components can be used as input to control one or more phases in a power supply.

BRIEF DESCRIPTION

Conventional applications such as those as discussed above can suffer from a number of deficiencies. For example, conventional power supplies typically cannot provide a sufficiently fast response to large changes in current demand. For example, if a conventional power supply outputs 50 amperes of current to power a load, and the load instantaneously changes and only requires 2 amperes, the conventional power supply may inadvertently produce an output voltage having a magnitude outside a tolerable range. In such an instance, a device powered by the output voltage may be damaged.

Conversely, if a conventional power supply outputs 2 amperes of current to power a load, and the load instantaneously requires 50 amperes, the conventional power supply may not be able to produce sufficient output current to prevent the output voltage from falling below or outside a tolerable range due to excessive current consumption. Accordingly, a device powered by the output voltage may turn OFF due to higher current consumption and a corresponding droop in a magnitude of the output voltage.

Conventional pulse width modulation (PWM) for regulating the magnitude of an output voltage while the switching period is kept constant is not very responsive to transients. Conventional PID control circuits cannot be directly used in PFM (pulse frequency modulation), because PFM is a non-linear control process.

In contrast to conventional techniques, embodiments herein deviate with respect to conventional applications. For example, embodiments herein include novel power supply control circuitry to adjust control signals.

More specifically, a power supply system includes a PID control circuit, a signal shaping circuit, and a PWM control circuit. The PID control circuit generates a signal based at least in part on an error voltage of the power supply system. The signal shaping circuit receives and converts the signal outputted from the PID control circuit and converts it into a linear control signal. During non-transient load conditions, the PWM control circuit utilizes the linear control signal outputted from the signal shaping circuit to adjust a switching period of a power supply control signal produced by the PID control circuit. In further embodiments, the switching period of the power supply control signal is maintained within a desired range during the non-transient condition. During transient conditions, settings of the PID control circuit are modified to provide a faster response. Additionally, during transient conditions, the switching period of the power supply control signal may be adjusted outside of the desired frequency range.

In accordance with further embodiments, the power supply system switches between controlling the signal shaping circuit between multiple modes. In a first mode, during a non-transient condition in which a slope of the error voltage is below a slope threshold value, the power supply system controls the signal shaping circuit to convert a signal generated by the PID control circuit into a linear control signal. In a second mode, during a transient condition in which a slope of the error voltage is above a slope threshold value, the power supply system controls the signal shaping circuit to convert the signal generated by the PID control circuit into a non-linear control signal.

In the transient mode, controlling the signal shaping circuit can further include implementing a shaping function in the signal shaping circuit to convert the linear control signal into a non-linear control signal. For example, in one embodiment, a magnitude of the signal received from the PID control circuit can be represented by a value of X. The signal shaping circuit converts the signal received from the PID control circuit into the linear control signal comprises producing the linear control signal outputted by the signal shaping circuit to be a magnitude of $X/(1+X)$. The signal shaping circuit can multiply the value $X/(1+X)$ by a value $S>1$ to convert the linear signal $X/(1+X)$ into a non-linear signal. During the non-transient mode, the signal shaping circuit multiplies the value $X/(1+X)$ by $S=1$. In this instance, the linear control signal $X/(1+X)$ is used to derive a setting of the power supply switching frequency.

To save on the cost and/or size of control circuitry, one embodiment herein includes implementing the linearizer circuit as a multi-piece linear function to convert the signal received from the PID control circuit into the linear control signal.

In yet further embodiments, during non-transient load conditions, the PID control circuit operates in a non-bypass mode in which both a D-component path and a P-component path of the PID control circuit include a primary filter (e.g., a filter including one or more poles) that filters the error voltage. In response to detecting a transient condition based at least in part on a change in the error voltage, the PID control circuit switches to operation in a bypass mode in which both the D-component path and the P-component path in the PID control circuit bypass the primary filter. Thus, in response to detecting a change in the error voltage or a transient condition, embodiments herein can include adjusting a bandwidth of filtering the error voltage in a P-component path and/or D-component path in the PID control circuit.

In accordance with yet further embodiments, one or more gain coefficients in the PID control circuit can be adjusted depending on the error voltage. For example, the power supply system can include a monitor circuit that monitors the error voltage. The monitor circuit can be configured to initiate adjusting settings of a P-component gain coefficient and a D-component gain coefficient in the PID control circuit depending on a state of the error voltage. By way of further non-limiting example, the monitor circuit can be configured to initiate increasing a magnitude of both a setting of the P-component gain coefficient and a setting of the D-component gain coefficient in the PID control circuit in response to detecting an increase in a magnitude of the error voltage or a transient condition.

In accordance with yet another embodiment, the power supply switching frequency can be configured to operate (or adjusted to operate) approximately at or around a preset value during non-transient conditions. In one embodiment, the preset value indicates a desired switching frequency setting of the power supply control. The preset value can be stored in a storage resource of the power supply control circuitry. During a transient condition, when the dynamic load of the power supply instantaneously consumes more current, instead of operating the switching frequency at the preset value, the control circuit adjusts the frequency to a value other than the preset value to account for the transient condition. Also, during the transient condition, a shaping function in the signal shaping circuit converts the linear control signal into a non-linear control signal. The non-linear control signal provides increased responsiveness to the transient condition.

Embodiments herein can further include maintaining a pulse width setting of the power supply control signal to be substantially constant while the switching period of the power supply control signal is adjusted in accordance with the control signal produced by the signal shaping circuit. Thus, the switching period of the power supply control signal can be adjusted at least in part based on the signal generated by the signal shaping circuit.

After occurrence of the transient load condition when the load consumes a more constant amount of current, the power supply control circuit can be configured to revert back to operating in a non-transient mode. When transitioning back to the non-transient load condition, embodiments herein can include implementing a duty cycle control circuit to adjust a duty cycle (e.g., pulse width) of the power supply control signal. Adjustments to the pulse width causes the switching frequency of the power supply control signal to revert slowly back to a switching frequency setting that is substantially equal to the desired switching frequency setting (as specified by the preset value).

Thus, in summary, and in accordance with one embodiment, during a non-transient load condition such as when the power supply operates in the steady state, the power supply control circuit adjusts the switching frequency (or switching period) of the power supply control signals to operate within or revert back to a desired switching frequency range as set by a user. Adjusting the switching frequency to operate within the desired range or around a chosen setpoint can include adjusting the duty cycle as mentioned. During a transient condition, when a load consumes additional current, the power supply operates in a bypass mode including an increased PID bandwidth response. For the transient mode, gain coefficients in a P-component path and/or D-component path of a PID compensation circuit can be increased. Additionally, in the transient mode, the power supply controls the signal shaping circuit to produce a non-linear control signal to more quickly change a setting of the switching period and control the output voltage via pulse frequency modulation control. To accommodate the transient, the switching period may be set to a value that falls outside of a desired frequency range (e.g., preset value) that is otherwise implemented during a non-transient mode. However, as mentioned, when switching back to the non-transient mode, a control circuit adjusts the switching period to revert back to operate the power supply frequency back within a desired range near the preset value again.

Thus, transient condition can cause the control circuitry to operate at a different frequency other than the preset value to provide a faster response. However, after the transient condition has passed, the control circuitry can be configured to revert back to operating at a desired frequency.

These and other more specific embodiments are disclosed in more detail below.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by International Rectifier of El Segundo, Calif., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. Additional summary of the invention is discussed below in the Detailed Description section. Thus, for additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

By way of a non-limiting example, a power supply system includes a PID control circuit, a signal shaping circuit, and a PWM control circuit. The PID control circuit generates a signal based at least in part on an error voltage of the power supply system. The signal shaping circuit receives and converts the signal outputted from the PID control circuit into a linear control signal.

During non-transient load conditions, via a first control loop, the PWM control circuit uses the linear control signal outputted from the signal shaping circuit to adjust a switching period of one or more power supply phase control signals to maintain a corresponding output voltage within regulation. Via a second control loop, and a duty cycle control circuit, the switching period of the power supply control signal can be constantly updated to maintain the switching frequency within a desired range during non-transient load conditions.

During transient conditions, such as when a dynamic load suddenly consumes a different amount of current, mode settings of the PID control circuit can be modified to provide a faster response to maintain the output voltage within a desired range. For example, in one embodiment, the switching period of one or more power supply control signals are adjusted outside of the desired frequency range (as set for operation during the transient condition) to accommodate a sudden change in current consumption and maintain the output voltage within a tolerable range.

Figure 1:
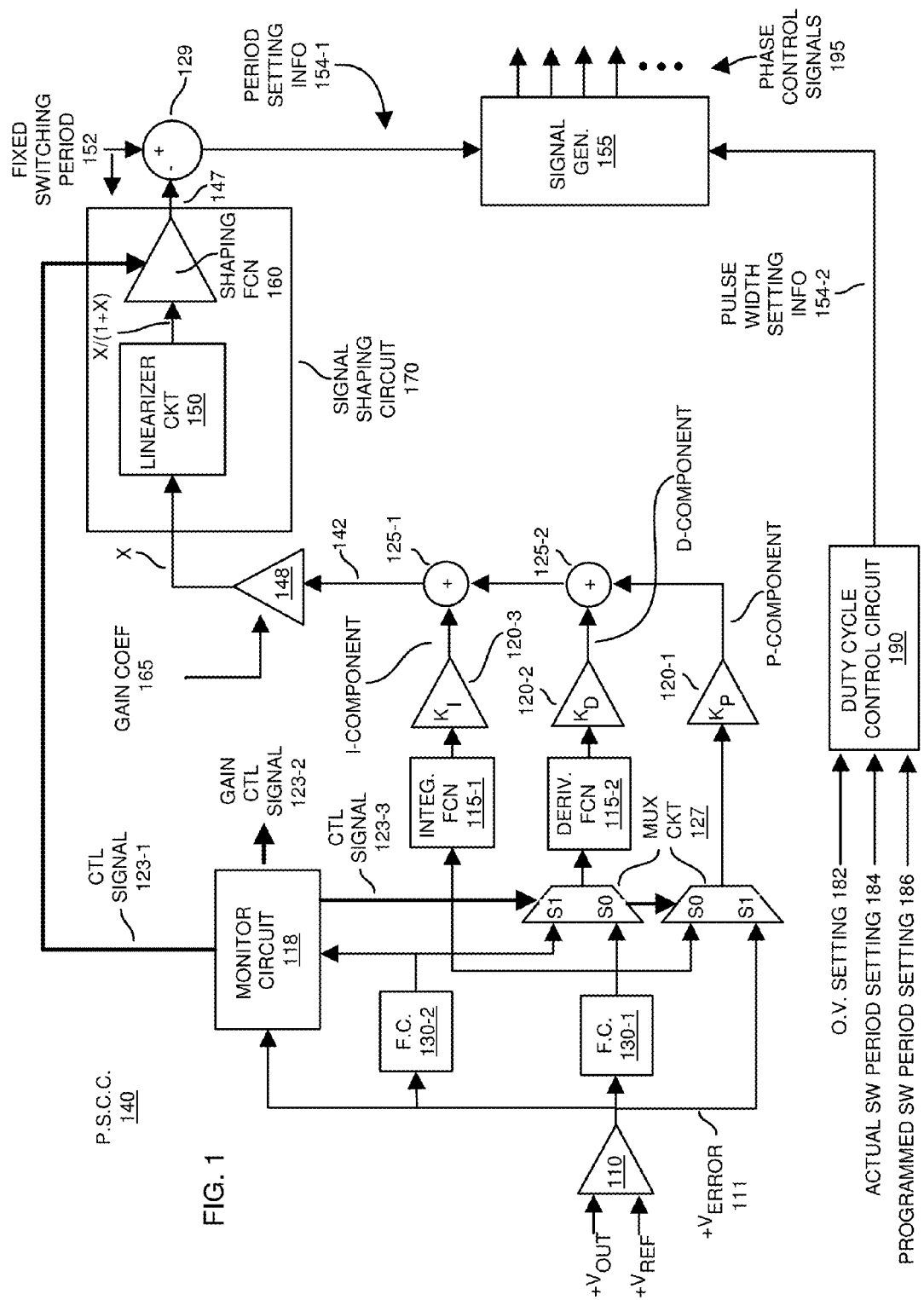
FIG. 1 is an example diagram of a power supply control circuitry according to embodiments herein.

FIG. 1 is an example diagram of power supply control circuitry according to embodiments herein.

During operation, via the signal generator 155, the power supply control circuitry 140 generates one or more phase control signals 195 to control one or more respective power converter phases. In one embodiment, the signal generator 155 adjusts the pulse width and/or switching frequency of the control signals 195 based on settings as specified by the period setting information 154-1 and the pulse width setting information 154-2.

The one or more power converter phases produces an output voltage 193 (FIG. 10), +Vout, that powers a respective dynamic load 119. This is more particularly shown and discussed in FIG. 10. The power consumed by the dynamic load 119 changes over time.

Referring again to FIG. 1, power supply control circuitry 140 includes circuitry 110 such as an analog-to-digital converter device, a comparator circuit, etc. Circuitry 110 constantly monitors the voltage error (Vref–Vout) using a high-speed analog to digital circuit and produces an error signal 111. Error voltage 111 represents a difference between a desired output voltage setpoint (e.g., Vref) and the current magnitude of the output voltage (e.g., +Vout) that is used to power the dynamic load 119.

The magnitude of Vout (and the error voltage 111) can change as a result of a transient condition in which the dynamic load of the power supply instantaneously consumes more or less power or current.

Power supply control circuitry 140 includes monitor circuit 118. As its name suggests, the monitor circuit 118 monitors the error signal 111. The monitor circuit 118 produces control signals 123 (e.g., control signal 123-1, control signal 123-2, control signal 123-3) to control the power supply circuitry.

By way of a non-limiting example, the monitor circuit 118 can monitor one or more attributes (e.g., magnitude, slope, etc.) of the error voltage 111 to determine conditions such as when the error signal 111 exceeds a threshold value, when the slope of the error voltage 111 is greater than a threshold value, etc.

In one example embodiment, the monitor circuit 118 defines a window around a zero voltage error using 2 thresholds, fc_hth (e.g., a high threshold value) and fc_lth (e.g., a low threshold value). The monitor circuit 118 defines a slope threshold (+ve or slope_hth for load release and –ve or slope_lth for load step up). By way of a non-limiting example, when the slope of the error signal 111 is greater than the +ve slope threshold value, it is presumed that the load instantaneously requires less current; when the slope of the error signal 111 is less than the –ve threshold value, it is presumed that the load requires more current.

The monitor circuit 118 also can define an overshoot error threshold voltage such as err_lth. In one embodiment, if the error signal 111 exceeds this threshold, pulses in each of one or more phase control signals can be eliminated to prevent overshooting of the output voltage during a load release in which the load instantaneously consumes less current.

Based on the magnitude and/or slope of the error signal 111, the monitor circuit 118 selects one or more modes in which to operate the power supply control circuitry 140. For example, as mentioned, the monitor circuit 118 produces control signals 123 (e.g., control signal 123-1, control signal 123-2, control signal 123-3, etc.) depending on the magnitude and/or slope of the error voltage 111.

As discussed in more detail below, each of the control signals 123 control a different function. For example, control signal 123-1 as produced by the monitor circuit 118 controls a setting of the signal shaping circuit 170; control signal 123-2 as produced by the monitor circuit 118 controls a setting of gain coefficients in the PID circuitry; control signal 123-3 as produced by the monitor circuit 118 controls whether the PID circuitry is set to a bypass mode.

As mentioned, signal generator 155 controls one or more phases in the power supply by producing phase control signals 195. Also, as mentioned, the pulse width modulation signal generator 155 utilizes the period setting information 154-1 to adjust and control the period of the one or more phase control signals 195; the pulse width modulation signal generator 155 utilizes the pulse width setting information 154-2 to adjust and control the pulse width setting of the one or more phase control signals 195.

One embodiment herein includes a duty cycle control circuit 190 to adjust the switching frequency of the control signals 195. During steady state, a customer operating a respective power supply control circuitry 140 may expect the voltage regulator to operate at a particular switching frequency at least during non-transient mode conditions to work well with the given load.

In one embodiment, since PFM (pulse frequency modulation) is used for control such as during both transient and non-transient modes, the switching frequency of the phase control signal 195 constantly changes depending on the load. However, to keep the average switching frequency close to a preset value such as a programmed switching frequency, embodiments herein include monitoring the instantaneous switching frequency of the power supply control circuitry 140, filtering it, and comparing it against a programmed switching frequency. As further discussed herein, if the filtered switching frequency is too high, embodiments herein include increasing the feed forward term (nominal pulse width). If the switching frequency is too low compared to a desired set-point, embodiments herein include increasing it by lowering the nominal pulse width.

Figure 2:
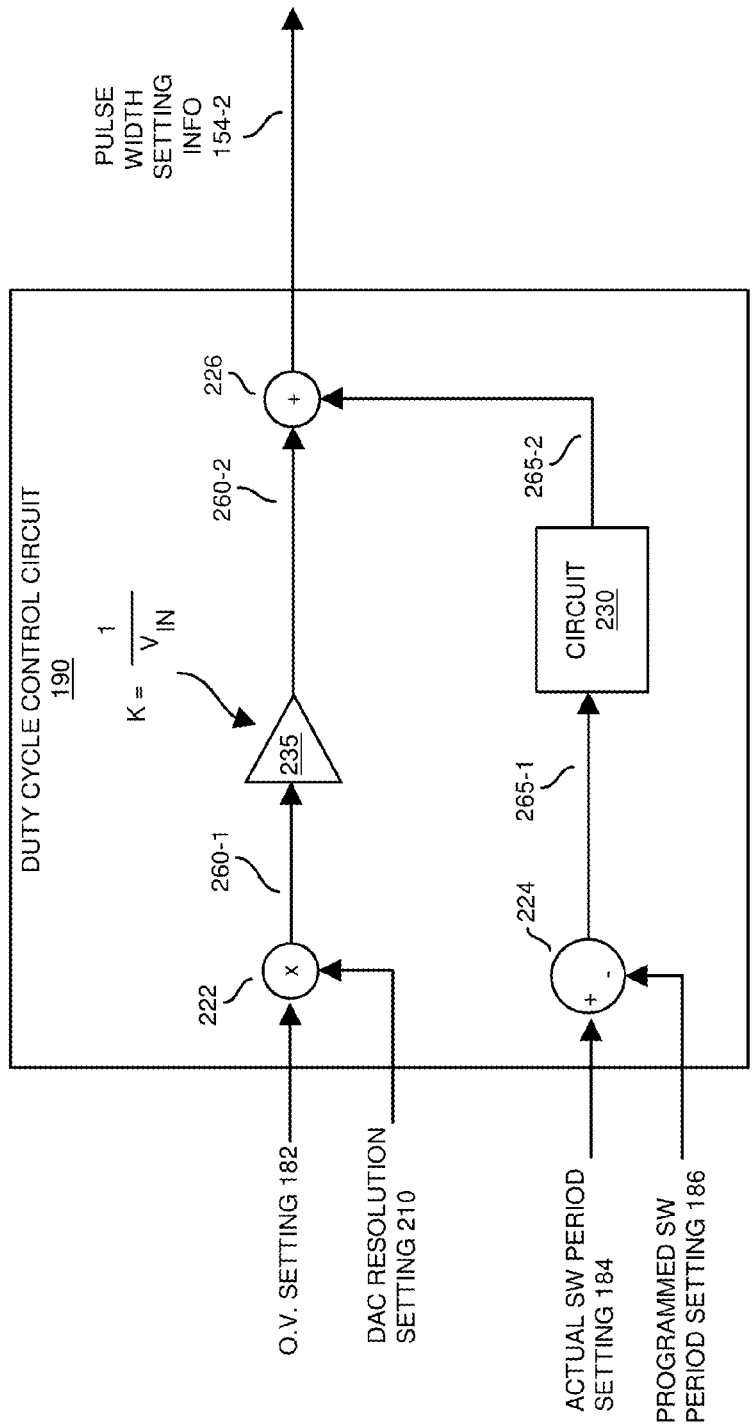
FIG. 2 is an example diagram of a duty cycle control circuit according to embodiments herein.

FIG. 2 is an example diagram illustrating a duty cycle control circuit according to embodiments herein.

As shown, the duty cycle control circuit 190 receives output voltage setting 182 (e.g., a current output voltage set-point such as voltage identifier DAC code), digital to analog converter resolution setting 210, actual switching period setting 184 (e.g., indicating a switching period of control signals 195), and the programmed switching period setting 186 (e.g., a desired set-point or preset value in which to operate the power supply during non-transient load conditions). Based on these inputs, the duty cycle control circuit 190 outputs pulse width setting information 154-2.

As previously discussed, the pulse width modulation signal generator 155 utilizes the pulse width setting information 154-2 to adjust and control the pulse width setting of the one or more phase control signals 195.

In one embodiment, duty cycle control circuit 190 includes multiplier function 222, difference function 224, gain circuit 235, and summer circuit 226.

During operation, and as its name suggests, the multiplier function 222 multiplies the output voltage setting 182 (i.e., desired output voltage setpoint) by the digital to analog converter resolution setting 210 to produce the output voltage setting signal 260-1. This specifies the desired setting of the power supply at a particular time. The gain circuit 235 multiplies the output voltage setting signal 260-1 by the coefficient K=1/Vin to produce the ideal duty cycle ratio signal 260-2.

The difference function subtracts the programmed switching period setting 186 (e.g., selected setpoint value to operate the power supply when in the steady state mode) from the actual switching period setting 184 (e.g., current setting of the switching period associated with control signals 195) to produce the switching period delta value 265-1. This represents a difference between the desired set-point frequency and the actual switching frequency of the control signals 195.

Circuit 230 receives the switching period delta value 265-1 and produces signal 265-2 (e.g., a so-called MOD value). For example, in one embodiment, if the switching period delta value 265-1 is positive, then the actual switch period setting 184 is greater than the programmed switching period 186. In such an instance, the circuit 230 reduces a setting of the signal 265-2 to reduce the pulse width setting as specified by the pulse width setting information 154-2. This results in reduction of the actual switching period setting 184 (e.g., higher switching frequency) because the PID control circuit and signal shaping circuit 170 react to decrease the switching period (e.g., via the switching period setting information 154-1).

On the other hand, if the switching period delta value 265-1 as produced by the circuit 230 is negative, then the actual switch period setting 184 is less than the programmed switching period 186. In such an instance, the circuit 230 increases a setting (e.g., magnitude) of the signal 265-2 to increase a current pulse width setting as specified by the pulse width setting information 154-2. Increasing the current pulse width results in an increase in the actual switching period setting 184 (e.g., lowers the switching frequency) because the PID control circuit and signal shaping circuit 170 react to increase the switching period specified by the switching period setting information 154-1.

In one embodiment, a non-zero setting of the adjustment value 265-2 maintains the switching period as specified by the actual switching period setting 184 of the power supply control circuitry 140 to be within a desired range. The non-zero setting value at which the switching period operates at a desired set-point can vary over time depending on one or more power supply parameters. However, note that even if parameters of the power supply happen to change, the circuit 230 will operate as discussed above to increase and/or decrease the magnitude of the adjustment value 265-2 in a respective feedback loop to maintain the switching frequency produced by the circuit 129 within a desired range or near a set-point during steady state conditions. Operating the switching period in a desired range enables optimal operation given the load (inductors, capacitors . . . ).

In accordance with another embodiment, the speed of the control loop implemented by the duty cycle control circuit 190 to adjust the switching period can be substantially slower than each of the transient control loop and the non-transient control loop of the PID control circuit as discussed herein. For example, as previously discussed, the transient control loop (e.g., operation of the PID control circuit in the transient mode) is substantially faster than the non-transient control loop (e.g., operation of the PID control circuit in the non-transient mode). Both the transient and non-transient control mode cause the power supply control circuitry 140 to operate in the PFM mode of operation to maintain the output voltage within a desired range. However, the control loop of the duty cycle control circuit 190 can be one or more magnitudes slower in response than either of these PID control loops. The slowness of the control loop associated with duty cycle control circuit 190 (to cause the power supply control circuitry 140 to operate near a desired switching frequency) prevents the duty cycle control circuit 190 from interfering with the more important control PID control loops that are used to maintain the output voltage within the desired range. Thus, adjustments made by the duty cycle control circuit 190 do not cause the magnitude of the output voltage to operate outside of a desired range. That is, the other portions of the power supply control circuit 140 adjust to operate at the new settings as caused by the duty cycle control circuit 190.

As previously discussed, when the load is fairly constant, and the power supply control circuitry 140 does not operate at a desired switching period, the duty cycle control circuit 190 adjusts the pulse width setting information 154-2 in a step-wise manner via multiple successive adjustments to change the switching period back near a desired set-point. During such adjustments, the PID control circuit (e.g., the control loop including the PID circuitry and signal shaping circuit 170) changes the actual switching period (e.g., via adjustment value 147) to accommodate the change in the pulse width setting initiated by the duty cycle control circuit 190. As discussed above, the step adjustments made by the duty cycle control circuit 190 to the pulse width setting information 154-2 can be so small that the PID control circuit (in both the transient and non-transient mode) can maintain a magnitude of the output voltage within a desired range, even during transient conditions.

Figure 3:
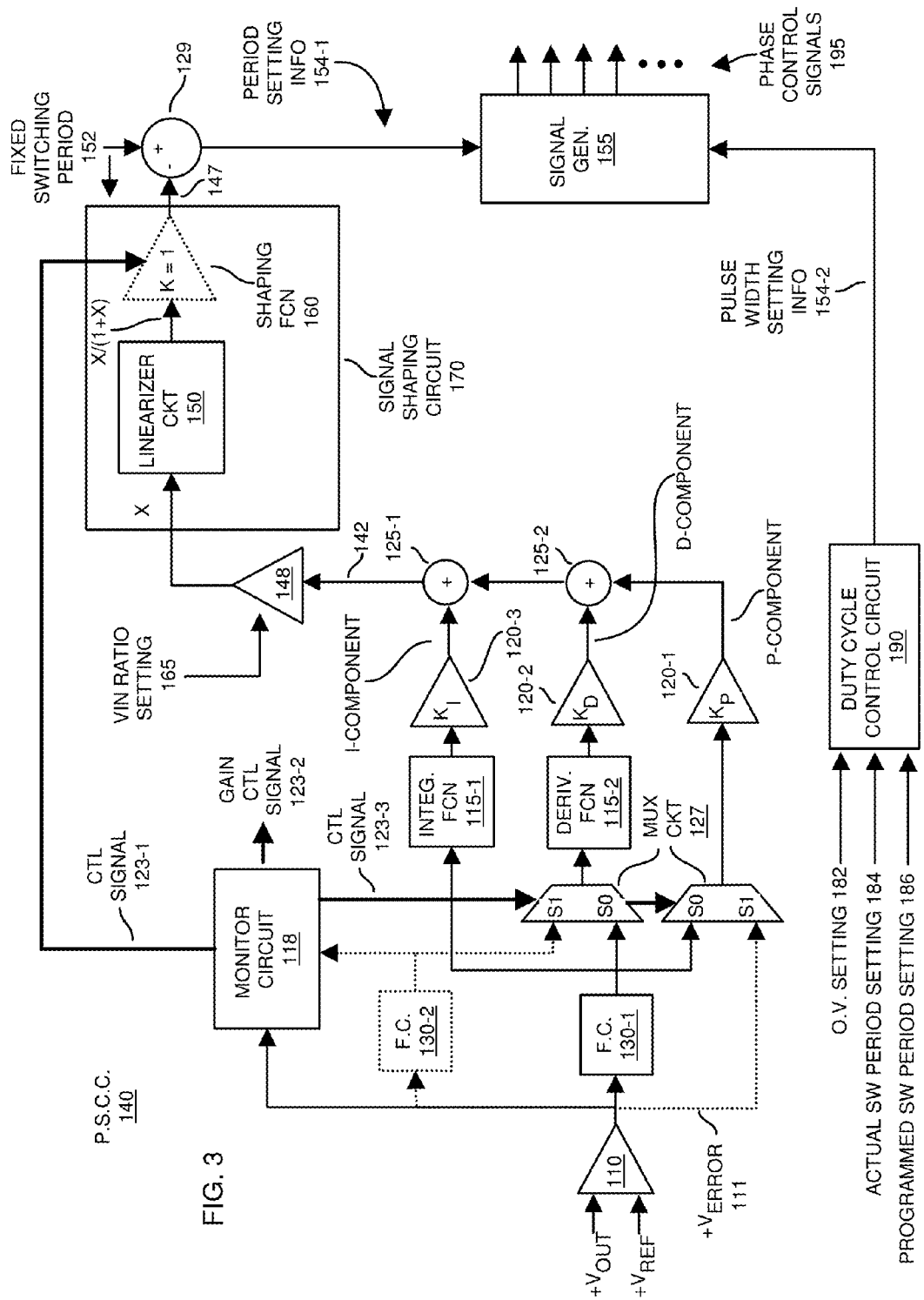
FIG. 3 is an example diagram of a power supply control circuitry operating in a first mode according to embodiments herein.

FIG. 3 is an example diagram illustrating operation of the power supply control circuitry in a non-transient mode according to embodiments herein.

In general, the circuitry in FIG. 3 outlined by dotted lines in the first circuit path indicates circuitry that is deactivated or not used during the non-transient mode. The other circuitry in FIG. 3 is activated during the non-transient mode.

Monitor circuit 118 monitors the error voltage 111. In response to detecting a condition in which a magnitude and slope of the error voltage is within a predetermined range (e.g., between a positive threshold value and negative threshold value) around an error voltage setting of 0, the monitor circuit 118 operates in state 0 (see also FIG. 5) or a non-transient mode.

While in the non-transient mode, the monitor circuit 118 produces control signal 123-3 to set multiplexer circuit 127 to the S0 input. In this instance, the derivative function 115-2, integrator function 115-1, and gain stage 120-1 receive a filtered version of the error voltage 111 from filter circuit 130-1.

In one embodiment, the filter circuit 130-1 includes one or more poles. By way of a non-limiting example, the filter circuit 130-1 can be set in the hundreds of KHz range to provide error voltage filtering. The one or more poles in the filter circuit 130-1 affect a responsiveness (e.g., make it slower to respond due to filtering) of the PID control circuit.

While in the non-transient mode, the monitor circuit 118 sets the gain associated with gain stage 120-1 to Kp; the monitor circuit 118 sets the gain associated with gain stage 120-2 to Kd; the monitor circuit 118 sets the gain associated with gain stage 120-3 to Ki.

Summer circuits 125 (e.g., summer circuit 125-1 and summer circuit 125-2) sum the I-component, the D-component, and the P-component outputted by the PID control circuit to produce PID control signal 142. Gain stage 148 multiplies signal 142 by gain coefficient 165. Gain coefficient can be any suitable value such as 1/Vin (e.g., Vin received from voltages 120 in FIG. 11).

In one embodiment, gain stage 148 multiples the PID control signal 142 by the gain coefficient 165 to produce signal X. Signal X represents a non-linear control signal.

Gain stage 148 outputs the signal X to signal shaping circuit 170. Via control signal 123-1 controls the settings of the signal shaping circuit 170. For example, while in the non-transient mode S0, when the error voltage 111 falls within a defined set of characteristics, the monitor circuit 118 sets the gain of the shaping function 160 to a value of 1 (e.g., K=S=1). The linearizer circuit 150 of signal shaping circuit 170 converts the signal X (e.g., a non-linear control signal) into a linear control signal X/(1+X).

In one embodiment, the value X/(1+X) is a fractional value. The shaping function 160 produces an adjustment value 147 by multiplying the linearized value X/(1+X)*(S=1) *(a value of the fixed switching period 152). The shaping function 160 inputs the adjustment value 147 to the −input (e.g., negative input) terminal of the difference circuit 129.

The period setting information 154-1 represents the fixed switching period 152 less the adjustment value 147. Because the shaping function 160 is set to a value of 1, the difference function 129 produces the period setting information 154-1 based on subtracting the linearized value X/(1+X)*(S=1)*(a value of the fixed switching period 152) from the fixed switching period 152.

Via the adjustments to the fixed switching period 152 (e.g., based on the adjustment value 147 and fractional adjustments), the power supply control circuitry 140 operates in a pulse frequency modulation mode to accommodate any changes in current or power consumption.

For example, in one embodiment, while keeping the pulse width of the phase control signals 195 relatively constant, and via adjusting the period setting information 154-1, the period of the phase control signals 195 are adjusted to maintain the output voltage within a desired range or near a desired set-point.

Recall that the power supply control circuitry 140 includes the duty cycle control circuit 190. As previously discussed, the duty cycle control circuit 190 continuously monitors the actual switching period setting 184 and compares it to the programmed switching period setting to adjust the pulse width setting information 154-2.

As discussed above, adjustment of the pulse width setting information 154-2 changes the duty cycle setting of the phase control signals 195 and causes the actual switching period setting 184 to be closer to the programmed switching period setting 186. Thus, the PID control circuit and corresponding signal shaping circuit 170 may adjust the period of the phase control signals 195 to keep a magnitude of the output voltage within a desired range. However, the duty cycle control circuit 190 simultaneously adjusts the actual switching period of the phase control signals 195 to be closer to the programmed switching period.

In one embodiment, as mentioned, the PID control circuit and corresponding shaping circuitry 170 in the non-transient mode provide a substantially faster response than the duty cycle control circuit 190. In other words, the power supply control circuitry 140 can be configured to control the frequency of the phase control signals 195 to account for changes in a dynamic load while the duty cycle control circuit 190 operates in the state mode to repeatedly adjust the switching frequency (via changes to the duty cycle) back to or near a desired switching frequency setting.

Mathematically, adjustment to the duty cycle is generally linear; adjustment of the frequency of the phase control signals 195 is non-linear. However, in this example embodiment, the signal shaping circuit 170 operates to control the frequency of the phase control signal 195 based on a linear control signal produced by the signal shaping circuit 170. In other words, adjustment to the period setting is linear as discussed above.

Figure 4:
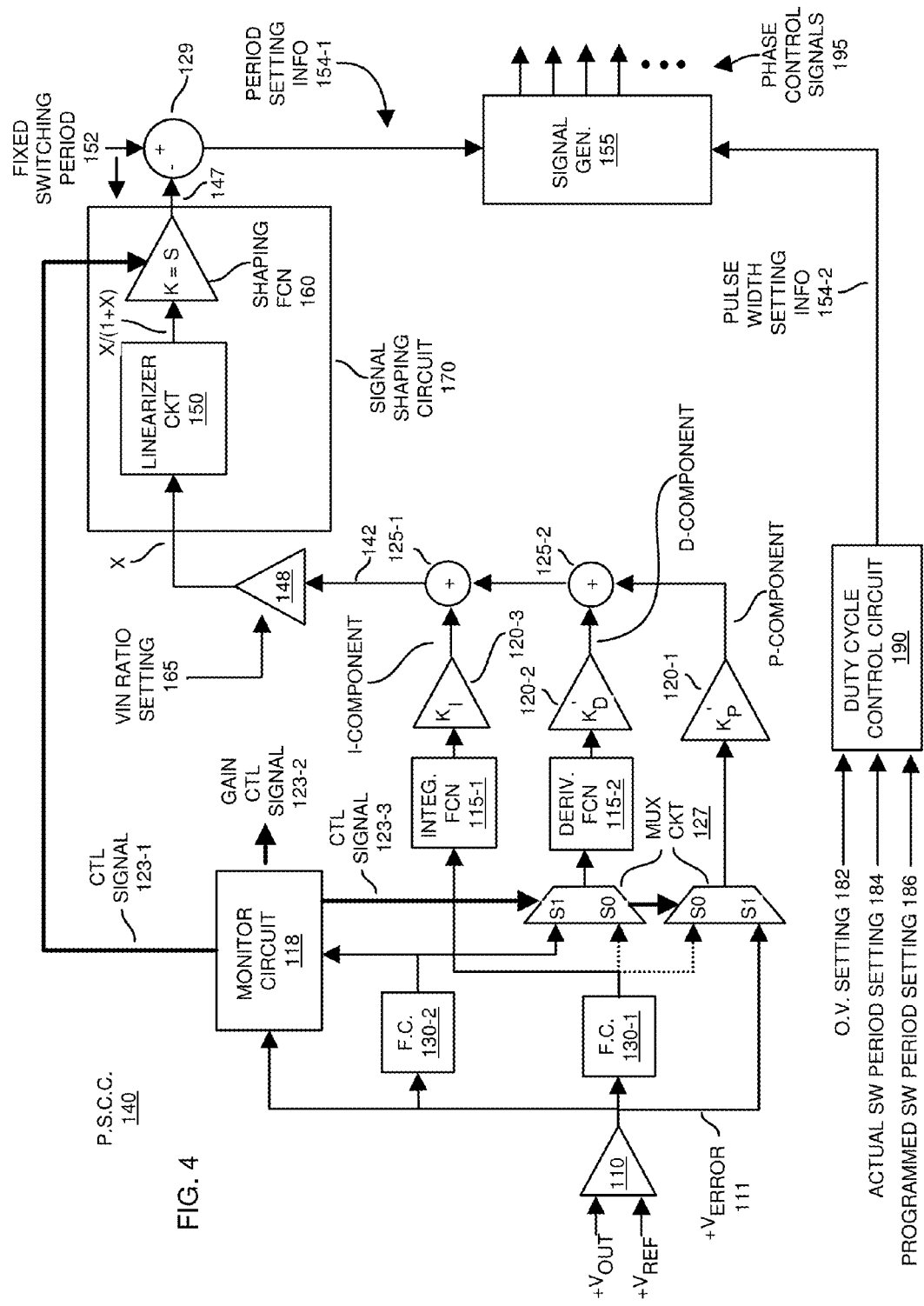
FIG. 4 is an example diagram of a power supply control circuitry operating in a second mode according to embodiments herein.

FIG. 4 is an example diagram illustrating operation of power supply control circuitry in a transient mode according to embodiments herein.

In general, the circuitry in FIG. 4 that is outlined by dotted lines is deactivated or not used during the transient mode. The other circuitry in FIG. 4 is activated during the transient mode.

As previously discussed, monitor circuit 118 monitors the error voltage 111. In response to detecting a transient load condition, the monitor circuit 118 controls the power supply circuitry to operate in a transient mode (e.g., see also state 1 in FIG. 5). In one embodiment, the monitor circuit 118 detects the transient condition based on detecting that either or both the magnitude and slope of the error voltage 111 is above a corresponding slope or corresponding magnitude threshold value.

While in the transient mode, the monitor circuit 118 generates the control signal 123-3 to set multiplexer circuit 127 to the S1 input.

In this instance, in the D-component path, the derivative function 115-2 receives a filtered version of the error voltage 111 from the filter circuit 130-2 instead of from filter circuit 130-1 as discussed above in the non-transient mode.

In one embodiment, the filter circuit 130-2 is a low pass filter. Filter circuit 130-1 is also a low pass filter. The filter circuit 130-2 provides a higher bandwidth as the low pass filter is set to a higher value than a setting of the filter circuit 130-1. For example, the filter circuit 130-2 passes from DC up to a set of higher frequencies than does the filter circuit 130-1. In one embodiment, the cutoff frequency of filter circuit 130-2 is more than two or more times higher than the setting of the cutoff of filter circuit 130-1.

In the P-component path, the gain stage 120-1 receives an unfiltered version of the error voltage 111 as opposed to receiving the filtered error voltage 111 from the filter circuit 130-1 as discussed above in the non-transient mode.

Additionally, while in the transient mode, the monitor circuit 118 generates control signal 123-2 to adjust the setting gain stages 120-1 and 120-2. In this instance, when in the transient mode, the monitor circuit 118 sets the gain associated with gain stage 120-1 to Kp'; the monitor circuit 118 sets the gain associated with gain stage 120-2 to Kd'; the monitor circuit 118 sets the gain associated with gain stage 120-3 to Ki.

By way of a non-limiting example, the gain value Kp'>Kp; the gain value Kd'>Kd. Increasing the gain coefficients in the gain stages 120-1 and 120-2 while in the transient mode increases a responsiveness of the PID control circuit to maintain the output voltage within a desired range.

Accordingly, one embodiment herein includes modifying settings of the PID control circuit depending on a state of the dynamic load. That is, the PID control circuit operates in a bypass mode and increased gain mode to accommodate transient conditions.

In a manner as previously discussed, summer circuits 125 (e.g., summer circuit 125-1 and summer circuit 125-2) sums the I-component, the D-component, and the P-component paths in the PID control circuit to produce PID control signal 142.

As previously discussed, gain stage 148 applies a gain factor 165 to the PID control signal 142 to produce signal X. Signal X outputted from the gain stage 148 represents a non-linear control signal.

Gain stage 148 outputs the signal X to signal shaping circuit 170. Via control signal 123-1, the monitor circuit 118 controls the settings of the signal shaping circuit 170. As previously discussed, the linearizer circuit 150 of signal shaping circuit 170 converts the signal X (e.g., a non-linear control signal) into a linear control signal $X/(1+X)$.

When the slope of the error voltage 111 is greater than the threshold value, the monitor circuit 118 adjusts a setting of the control signal 123-1 such that the signal shaping circuit 170 produces a non-linear control signal into difference function 129. For example, via control signal 123-1, the monitor circuit 118 sets the gain of the shaping function 160 to be a value of S>1 to convert the linearized signal $X/(1+X)$ into a non-linear control signal. As previously discussed, the value of S can be a pre-programmed value selected by a user. Different example values of the value S are discussed in more detail with respect to FIG. 6, which illustrates the overall non-linear effect of each setting of S>1.

While in the transient mode, and when the slope of the error voltage 111 is greater than a slope threshold value, the shaping circuit 160 produces adjustment value 147. In this instance, as mentioned, S is a value greater than 1. The shaping function 160 produces the adjustment value to equal $S*X/(1+X)*$(a value of the fixed switching period 152). In one embodiment, the value $S*X/(1+X)$ is a fractional value of the fixed switching period 152.

Via adjustments to the fixed switching period 152 using the adjustment value 147, the power supply control circuitry 140 operates in the pulse frequency modulation mode to accommodate any changes in current or power consumption during the transient condition.

In one embodiment, while in the transient mode, the pulse width setting info 154-2 produced by the duty cycle control circuit 190 is relatively constant. The pulse width modulation signal generator 155 adjusts the switching period or switching frequency of the phase control signals 195 to maintain the output voltage within a desired range or near a desired setpoint.

As previously discussed, the duty cycle control circuit 190 continuously monitors the actual switching period setting 184 and compares it to the programmed switching period setting 186. In general, the duty cycle control circuit 190 (as mentioned above, at least slowly) adjusts the pulse width setting information 154-2 to cause the switching period of the power supply control circuit 140 to be closer in value to the programmed switching period setting 186. However, while in the transient mode, the duty cycle control circuit 190 has little effect on adjusting the switching period because the PID control circuit and the signal shaping circuit 170 have a higher bandwidth response and are much more responsive. After switching back to the non-transient mode, in a manner as previously discussed, the duty cycle control circuit 190 adjusts the duty cycle to maintain the switching period within a desired range or near a set-point by adjusting the duty cycle (e.g., pulse width setting 154-2).

Thus, summarizing aspects discussed in FIGS. 3 and 4, during steady state, embodiments herein can include a programmable filter circuit 130-1 having one or more programmable poles in the PID compensator control path. During the transient mode, embodiments herein include bypassing the filter circuit 130-1 for the P-component, and using only filter circuit 130-2 for the D-component. This reduces delay for these PID components and greatly improves response time. As mentioned, the power supply control circuitry 140 operates in a PFM mode during both the transient and non-transient modes.

Figure 5:
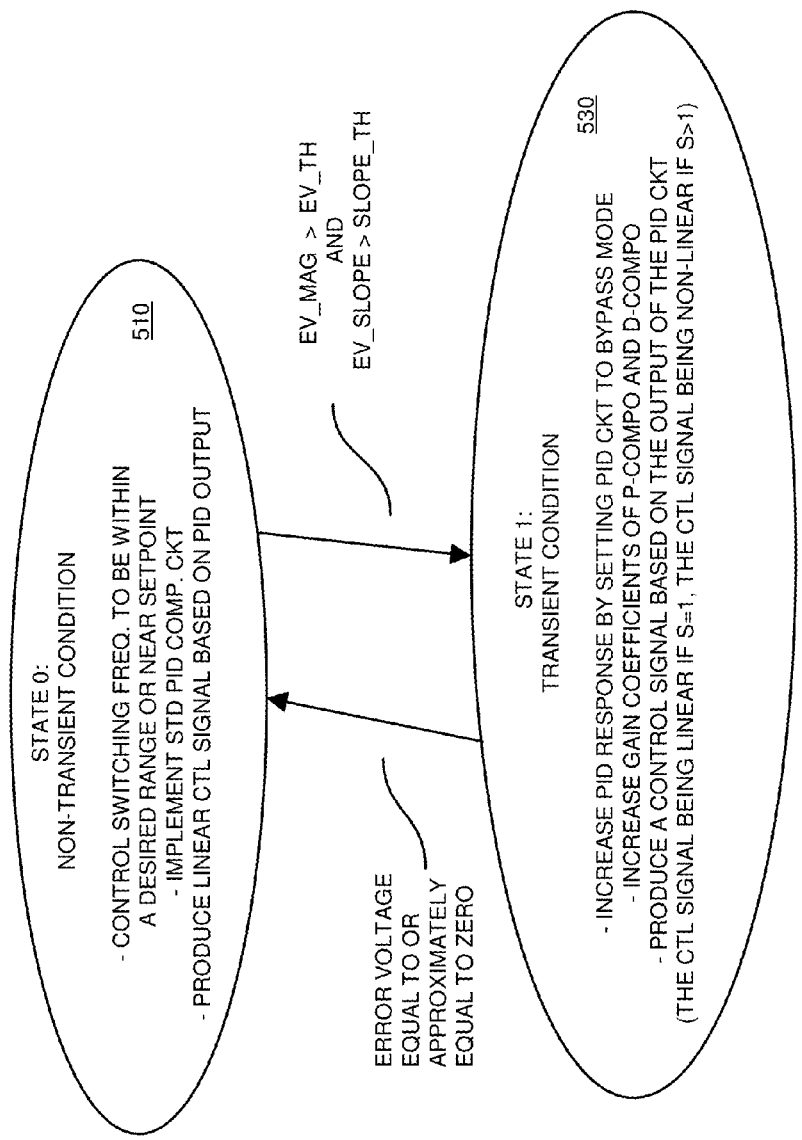
FIG. 5 is an example diagram illustrating different control states according to embodiments herein.

FIG. 5 is an example state diagram illustrating states of switching between a transient mode and non-transient mode according to embodiments herein. In general, in state 1, the output need not be non-linear. In one embodiment, it is up to the user to program the multiplier (e.g., value of S in the shaping function 160) in state 1. If the multiplier S is set to a value of 1, the output is linear. If the value of S is set to a value >1, the output is non linear.

Now, more particularly, state 510 indicates operation of the power supply control circuitry 140 in the steady state or non-transient when the power and/or current consumed by the load 119 is relatively constant or steady.

While in the non-transient mode, and as discussed above, the power supply control circuitry 140 implements a PID compensation circuit that has relatively slow response characteristics. Additionally, while in the non-transient mode, the duty cycle control circuit 190 acts to adjust the switching period (e.g., period setting info 154-1) to operate at or near a rate as specified by the programmed switching period setting 186. Also, during the non-transient condition such as when the slope of the error voltage 111 is below a threshold value, the signal shaping circuit 170 outputs a linear control signal X/(1+X) to the difference function 129 to control the period setting information 154-1.

Detection of a transient condition such as a higher demand for current (e.g., a load step up), the monitor circuit 118 initiates switch over from operating in state 510 to operating in state 530. In one embodiment, the monitor circuit 118 initiates switch over from state 510 to state 530 in response to detecting that a magnitude of the error signal 111 is less than an error voltage threshold value and/or that the slope of the error signal 111 is less than a slope threshold value.

While in state 1, or in the transient mode, the monitor circuit 118 increases a responsiveness of the PID control circuit. For example, as mentioned, this can include adjusting the gain coefficients associated with the PID control circuit as well as bypassing one or more filters (e.g., filter circuit 130-1) in the PID control circuit 140 to provide a faster response to accommodate the transient condition. Additionally, during a transient condition when the slope of the error voltage 111 is greater than a threshold value, the monitor circuit 118 adjusts settings of the signal shaping circuit 170 such that the signal shaping circuit 170 produces a non-linear control signal.

By further way of a non-limiting example, the monitor circuit 118 initiates switch over from state 530 to state 510 in response to detecting that the error voltage is equal to or close to 0. When switching over to the non-transient mode, the duty cycle control circuit 190 operates to adjust the setting of the switching period based on adjustments to the pulse width setting information 154-2. As mentioned above, adjustments to the pulse width setting information in the non-transient mode causes the period setting information 154-1 to operate closer to the programmed switching period setting 186.

Thus, in summary, the power supply control circuitry 140 operates in a PFM mode regardless of whether the power supply control circuitry 140 is set to the transient mode or non-transient mode. That is, by way of a non-limiting example, both the transient and non-transient mode can include operating in a PFM mode to maintain a magnitude of the output voltage within a desired range. The duty cycle control circuit 190 operates in a background (or se control loop) during the non-transient mode to enable control of the switching period to a predetermined setting during non-transient mode conditions. The responsiveness of the PID circuit in power supply control circuitry 140 changes depending on the mode setting. For example, the PID control circuit is more responsive and has a higher bandwidth and gain coefficient settings during transient conditions. Additionally, the signal shaping circuit 170 shapes the signal produced by the PID control circuit to be linear or non-linear depending on the state of the load and/or the slope of the error voltage 111.

Figure 6:
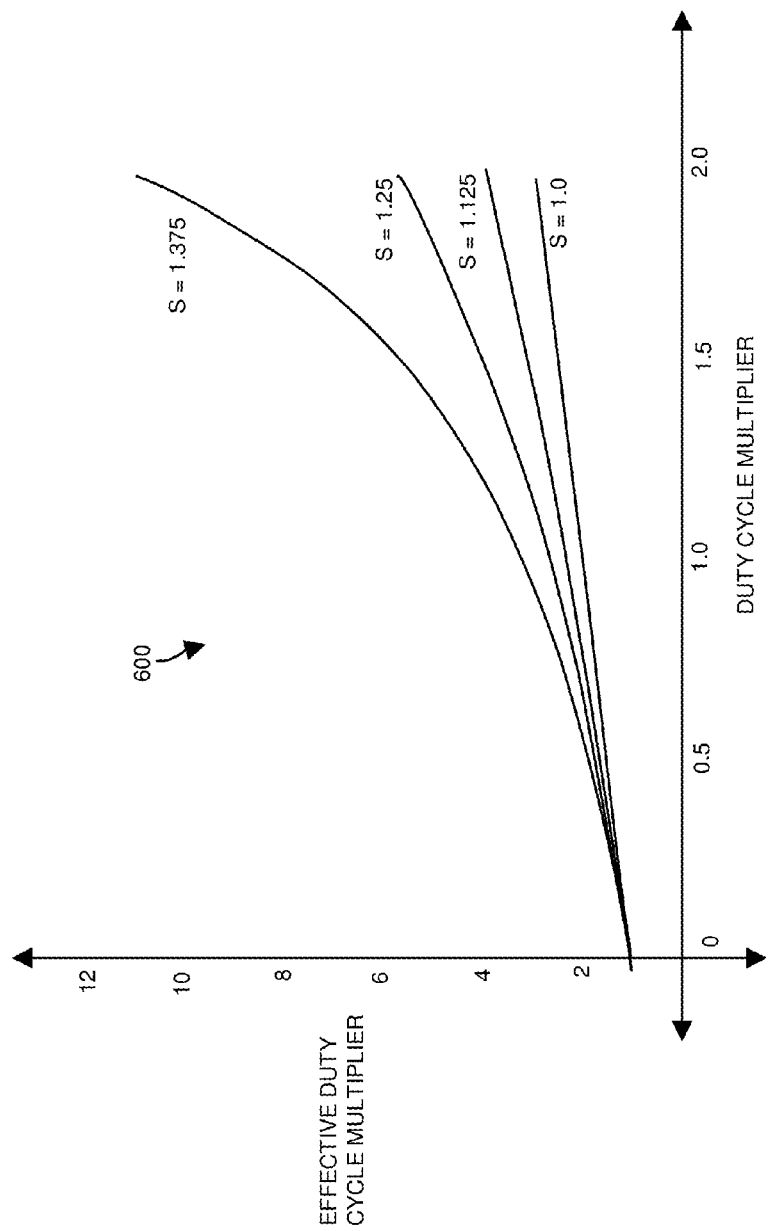
FIG. 6 is an example diagram illustrating different effective duty cycle multipliers shaping functions according to embodiments herein.

FIG. 6 is an example diagram illustrating different effective duty cycle multipliers according to embodiments herein.

As previously discussed, the shaping function 160 can be configured to provide any of the gain curves S>=1 during the transient mode. As previously discussed, the monitor circuit 118 sets the gain of the shaping function 160 to S=1 during non-transient conditions.

During transient conditions, the monitor circuit 118 sets the gain of the shaping function 160 to be a value of S>=1 as previously chosen by user. FIG. 6 illustrates the different possible settings of S>=1 that can be selected by a user as well as the effectiveness of each of the different selectable S-values. The S-values greater than a value of 1 provide a non-linear response because the S-value is multiplied by the period setting to make adjustments.

Figure 7:
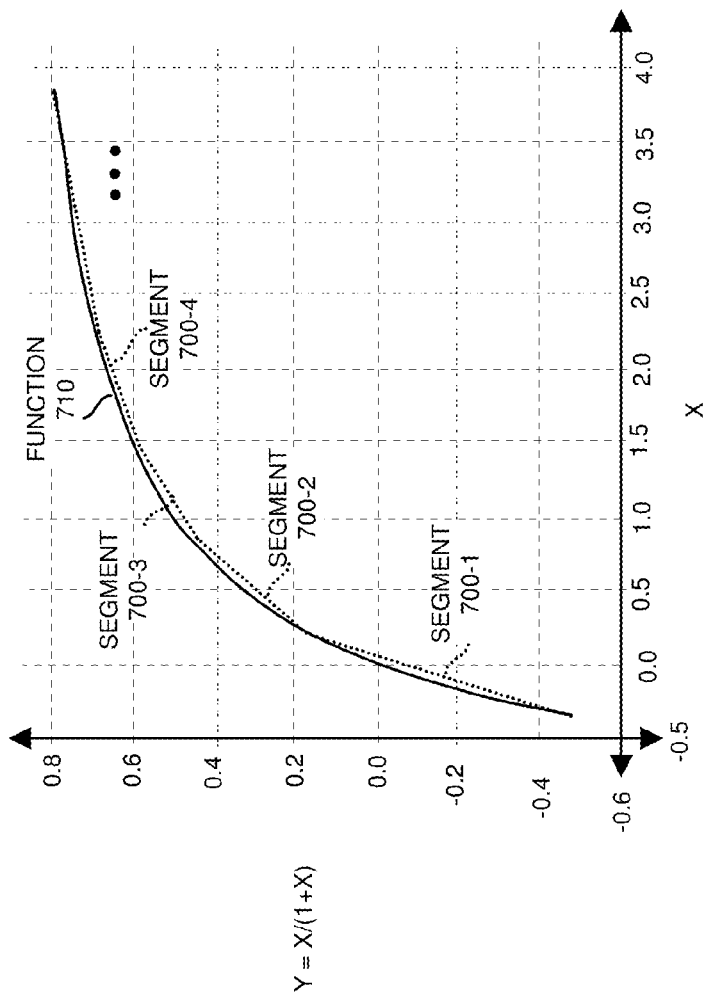
FIG. 7 is an example diagram illustrating a piece-wise linear approximation according to embodiments herein.

FIG. 7 is an example diagram illustrating a technique of approximating function 710 according to embodiments herein. Function 710 provides a basis on which to convert non-linear control signal into a linear control signal as discussed herein.

To reduce circuit costs and space, a gate count needed to implement the linearize functionality associated with linearizer circuit 150 can be reduced. In one embodiment, the function Y=X/(1+X) function is implemented as a piecewise linear approximation. There are many different ways of doing this, such as employing different numbers of line segments.

One embodiment herein includes an approximation that consists of 5 line segments for X range [−0.3125, 4]. This approximation results in a 10× reduction in gate count, thus making this control method economical and feasible in hardware.

An example of a piece-wise function is shown in FIG. 7. As previously discussed, the linearizer circuit 150 converts signal X into signal Y=X/(1+X). By way of a non-limiting example, the linearizer circuit 150 can be configured to convert the signal X via a piece-wise linear function including segment 700-1, segment 700-2, segment 700-3, segment 700-4, etc., as shown in FIG. 7.

Figure 8:
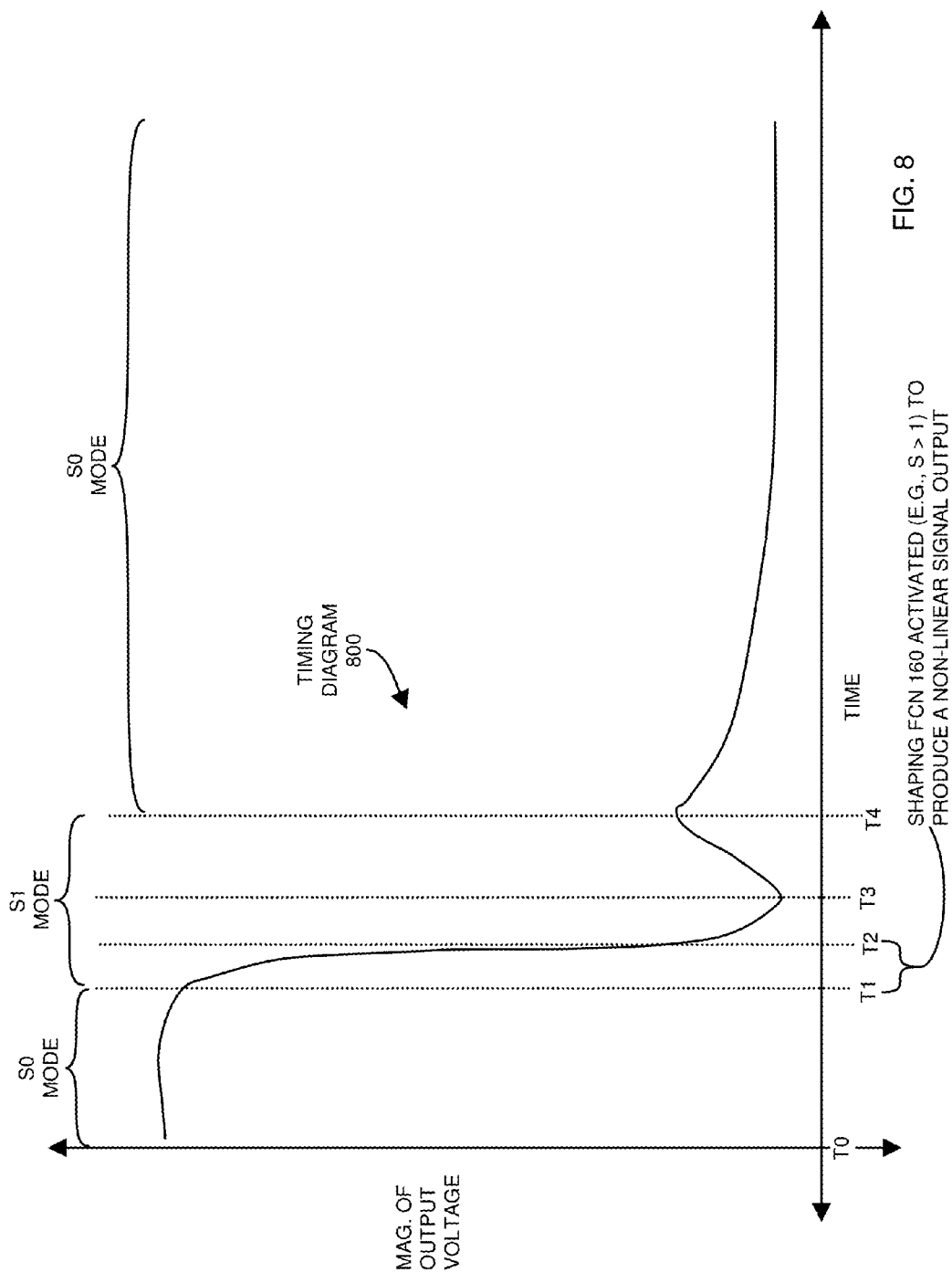
FIG. 8 is an example theoretical timing diagram illustrating a change in output voltage due to an increase in current consumption by a load according to embodiments herein.

FIG. 8 is an example theoretical timing diagram 800 illustrating a change in output voltage due to an increase in current consumption by a load according to embodiments herein.

As shown, between time T0 and time T1, the control circuitry 140 operates in mode S0 (e.g., non-transient mode). The value of S is set to S=1.

At time T1, as a result of a condition such as increased current consumption by the load, the monitor circuit 118 of control circuitry 140 detects that an absolute value of the magnitude and/or absolute value of the slope of the error signal 111 is above a threshold value. In response to detecting this transient condition at or around time T1, the control circuitry 140 initiates switch over from mode S0 to S1 in a manner as previously discussed.

Between time T1 and T2, in addition to adjusting settings of the PID control circuit as previously discussed, the monitor circuit 118 sets the shaping function 160 to an appropriate value of S>=1 such that the signal shaping circuit 170 outputs a non-linear control signal.

At time T2, when the slope of the error signal 111 is no longer above a slope threshold value, the monitor circuit 118 sets the shaping function 160 such that S=1. Thus, after time T=2, the signal produced by the signal shaping circuit 170 is a linear control signal again.

At time T3, the slope of the error signal 111 goes to zero. This is the point where the contribution from the D-component in the PID control circuit goes to zero. Subsequent to time T3, this D-component can be negative.

At time T4, the error signal 111 is zero or is negative and the monitor circuit 118 initiates switch over from the S1 mode (e.g., transient mode) back to the S0 mode (e.g., non-transient mode).

In a similar manner, during a condition in which the load 119 instantaneously consumes less current, the monitor circuit 118 operates the power supply control circuitry 140 in the non-transient mode. Pulses can be removed to prevent the over-voltage condition on the output voltage.

By further way of a non-limiting example, one embodiment herein includes defining an overshoot threshold, err_lth. If a magnitude of the error voltage 111 exceeds this threshold, all phase control signals 195 can be terminated. In one example embodiment, the pulse width modulation signal generator 155 does not terminate the pulses until completing a cycle such that there are no partial pulses generated after they are started. This improves phase current balance.

In one embodiment, it is desirable that the each activated phase provides a same amount of current to the load as other activated phases. In such an instance, the pulse width modulation signal generator 155 can be configured to the generate phase control signals 195 to have a substantially same sized pulse width to provide substantially equal inductor charge time in each activated phase such that the individual phases do not need to be individually adjusted with respect to each other during a transient condition.

Figure 9:
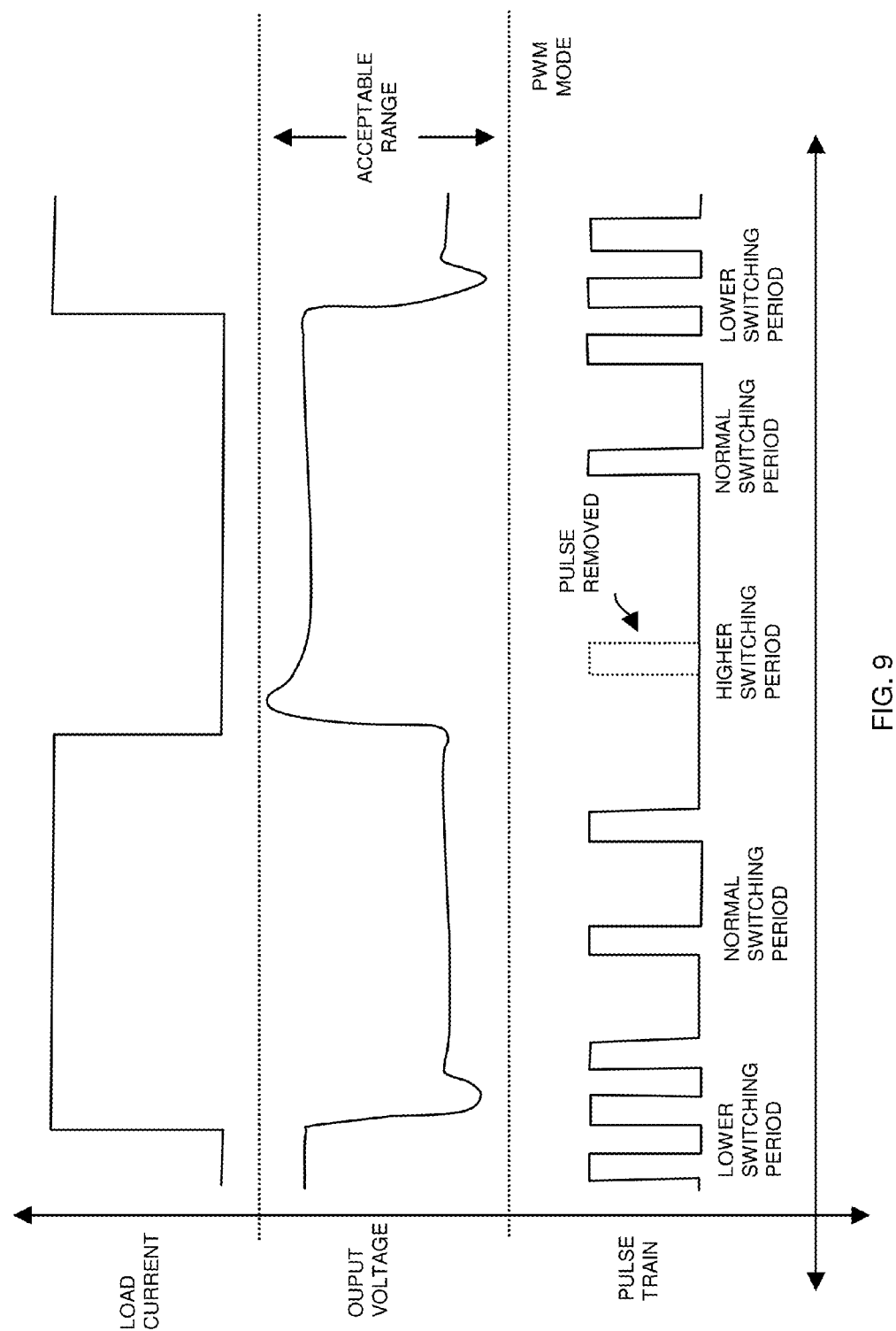
FIG. 9 is an example theoretical timing diagram of control pulses generated by a control circuitry to maintain the output voltage within an acceptable range during steady state and transient conditions according to embodiments herein.

FIG. 9 is an example timing diagram of control pulses generated by a control circuitry to maintain the output voltage within an acceptable range during steady state and transient conditions according to embodiments herein.

As shown, the power supply control circuitry 140 operates in different modes (e.g., S0 and S1) to keep a magnitude of the output voltage, Vout, within an acceptable range. The logic high states in the pulse train (e.g., control signal 195-1) indicate activation of high side switch circuitry in one or more power converter phases to prevent the output voltage from falling below a threshold value during an increase in current consumption by the load. Generally, the logic low sates of the pulse train indicate when a respective low side switch in a phase is activated.

The generation of extra pulses (as a result of decreasing the actual switching period so that pulses are closer in time with respect to each other) during or around a time of a load step-up transient condition (e.g., instantaneous consumption of more current) prevents a magnitude of the output voltage 193 from falling below a desired range.

Preventing generation of or removing one or more pulses (as a result of increasing the actual switching period so that pulses are farther apart in time with respect to each other) during or around a time of a load step-down transient condition (e.g., instantaneous lower consumption of current) prevents a magnitude of the output voltage from spiking above a desired range.

In one embodiment, operation of the power supply control circuitry 140 in the non-transient mode is sufficiently quick enough to adjust a switching period as indicated by the period setting information 154-1 to prevent generation of pulses in the phase control signals 195. In such an instance, there is no need to operate the PID control circuit and/or signal shaping circuit 170 in the transient mode.

Figure 10:
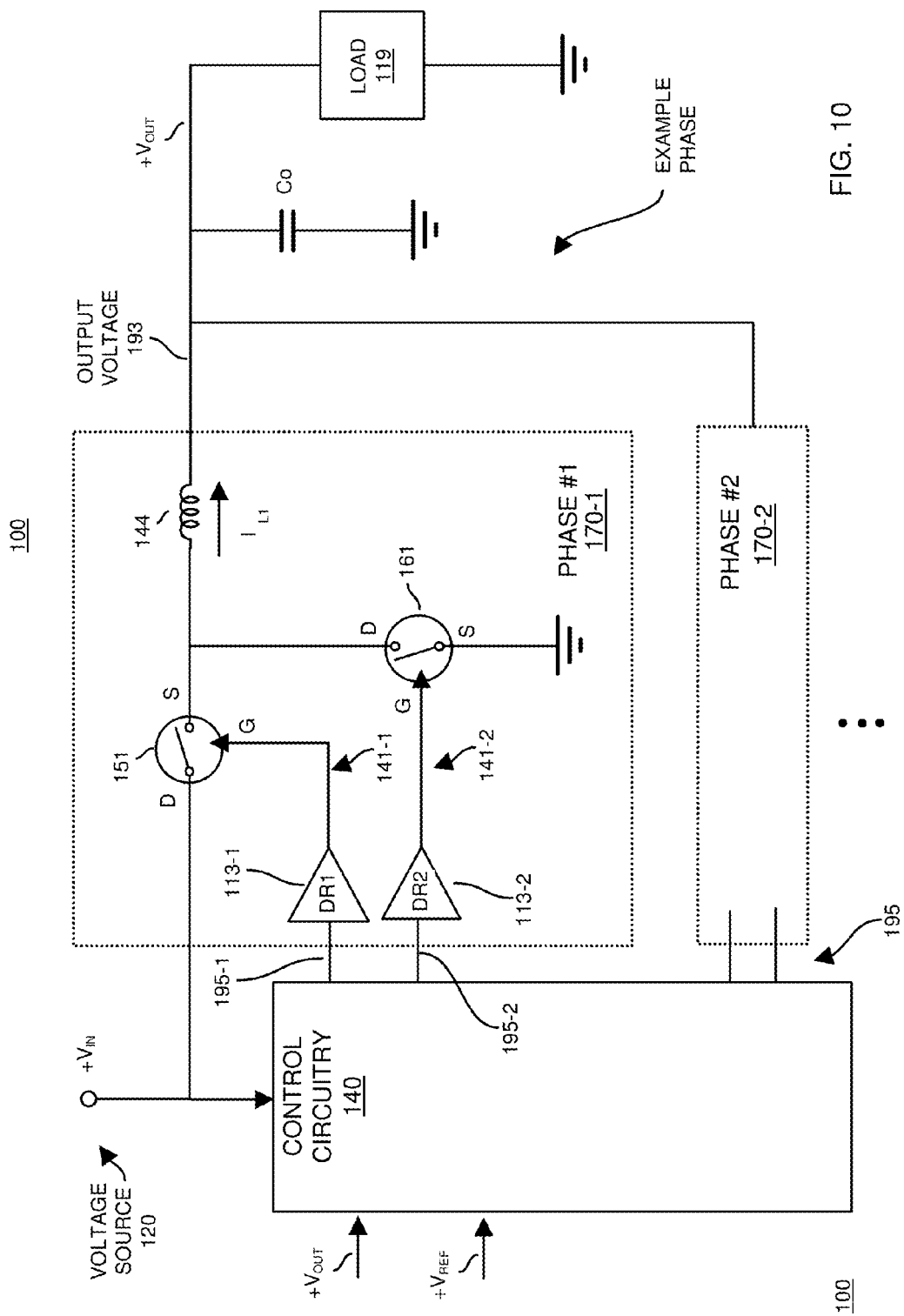
FIG. 10 is an example diagram illustrating a power supply circuit including control circuitry to drive one or more power converter phases according to embodiments herein.

FIG. 10 is an example diagram illustrating a power supply circuit driving one or more power converter phases according to embodiments herein.

As shown, the power supply 100 includes power supply control circuitry 140. Power supply control circuitry 140 controls an operation of power supply 100 and produces output voltage 193 (i.e., +Vout) based at least in part on +Vref as mentioned.

More specifically, according to one embodiment, power supply control circuitry 140 receives inputs or feedback such as Vin, Vout, Vref, current provided by each active phase, etc.

Based on operating conditions of power supply 100, and via generation of phase control signal 195-1, phase control signal 195-2, etc., the control circuitry 140 activates one or more power converter phases (e.g., phase #1, phase #2, etc.) to produce output voltage 193.

Based on the received inputs and configuration settings of power supply control circuitry 140 as previously discussed, the power supply control circuitry 100 outputs phase control signals 195 to switch the high side switch 151 and low side switch 161 ON and OFF when a first phase such as phase 170-1 is activated. When a phase is deactivated, both the high side switch and the low side switch are controlled to an OFF state. Switching operation of high side switch 151 and low side switch 161 produces output voltage 193 to power load 119.

In one embodiment, the power supply control circuitry 140 generates phase control signal 195-1 and phase control signal 195-2 to control the driver circuits 113-1 and 113-2 as shown. Based on control signals received from the control circuitry 140, driver 113-1 controls a state of high side switch 151 (e.g., a control switch) and driver 113-2 controls a state of low side switch 161 (e.g., a synchronous switch) in power supply phase 170-1.

Note that driver circuits 113 (e.g., driver circuit 113-1 and driver circuit 113-2) can be located in the control circuitry 140 or can reside at a remote location with respect to the power supply control circuitry 140.

When high side switch 151 is turned ON (i.e., activated) via control signals generated by control circuitry 140 (while the low side 161 or synchronous switch is OFF), the current supplied to the load 119 through inductor 144 increases via a highly conductive electrical path provided by high side switch 151 between voltage source 120 and inductor 144.

When low side switch 161 is turned ON (i.e., activated) via control signals generated by control circuitry 140 (while the high side switch 151 or control switch is OFF), the current supplied to the ld 119 through inductor 144 decreases based on an electrically conductive electrical path provided by the low side switch 161 between the inductor 144 and ground as shown.

Based on proper switching of the high side switch 151 and the low side switch 161, the control circuitry 140 regulates the output voltage 193 within a desired range to power load 119.

In one embodiment, power supply 100 includes multiple phases as shown. Each of the multiple phases can be similar to the example phase 170-1. During heavier load 119 conditions, when the load 119 consumes more power, the power supply control circuitry 140 can be configured to initiate activation of more phases 170. During lighter load 119 conditions, the power supply control circuitry 140 can be configured to activate fewer phases such as a single phase. Thus, via phase shedding or adding, the power supply control circuitry 140 activates one or more phases to maintain the output voltage 193 within a desired range to power load 119.

As shown, each phase can include a respective high side switch circuit and low side switch circuit as previously discussed. To deactivate a respective phase, the phase control circuitry 140 can set both high side switch circuitry and low side switch circuitry of the respective phase to an OFF state. When off or deactivated, the respective phase does not contribute to producing current to power the load 119.

The control circuitry 140 can select how many phases to activate depending on an amount of current consumed by the load 119. For example, when the load 119 consumes a relatively large amount of current, the control circuitry 140 can activate multiple phases to power the load 119. When the load 119 consumes a relatively small amount of current, the control circuitry 140 can activate fewer or a single phase to power the load 119.

In accordance with further embodiments, the phases 170 can be operated out of phase with respect to each other.

Any of multiple different types of methods such as estimations or physical measurements can be implemented in the power supply 100 to detect an amount of current provided by each of the phases or an overall amount of current consumed by the load 119. Such information may be useful in determining how phases should be activated to produce the output voltage 193.

As previously discussed, the power supply control circuitry 140 can be configured to also monitor other suitable parameters such as a magnitude of the output voltage 193.

Note that the control circuitry 140 can include or be a computer, processor, micro-control circuitry, digital signal processor, etc., configured to carry out and/or support any or all of the method operations disclosed herein. In other words, the power supply control circuitry 140 can include one or more computerized devices, processors, digital signal processor, computer readable storage medium, etc. to operate as explained herein to carry out different embodiments of the invention.

Note that embodiments herein such as control circuitry 140 can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic (e.g., software, firmware, instructions, . . . ) encoded thereon that, when performed in the control circuitry 140 having a processor and corresponding storage, programs the control circuitry 140 to digitally perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the control circuitry 140 to cause the control circuitry 140 to perform the techniques explained herein.

Figure 11:
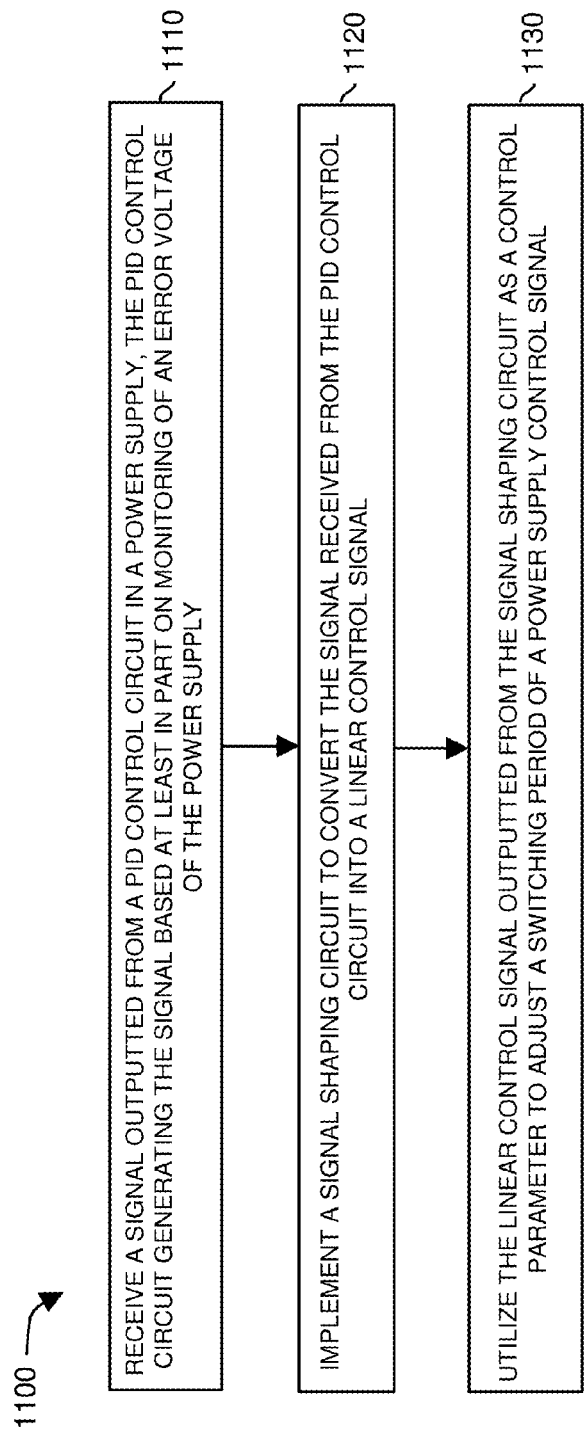
FIG. 11 is a flowchart illustrating an example method according to embodiments herein.

FIG. 11 is a flowchart 1200 illustrating an example method of controlling operation of a power supply according to embodiments herein. Note that there will be some overlap with respect to concepts as discussed above. Also, the steps can be executed in any suitable order.

In step 1110, the control circuitry 140 receives a signal outputted from a PID control circuit in a power supply. The PID control circuit generates the signal based at least in part on monitoring of an error voltage of the power supply.

In step 1120, the control circuitry 140 implements a signal shaping circuit to convert the signal received from the PID control circuit into a linear control signal.

In step 1130, the control circuitry 140 utilizes the linear control signal outputted from the signal shaping circuit as a control parameter to adjust a switching period of a power supply control signal.

Note again that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or a non-transitory computer readable media) including computer program logic encoded thereon that, when performed in a computerized device having a processor and corresponding storage, programs the processor to perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the control circuitry 140 to cause the control circuitry 140 to perform the techniques explained herein.

Accordingly, one particular embodiment of the present disclosure is directed to a computer program product that includes a non-transitory computer readable hardware storage medium (e.g., memory, storage repository, optical disk, integrated circuit, etc.). In other words, the control circuitry 140 as discussed herein can include a computer readable hardware medium for storing the current estimation and mode control algorithm. Such an algorithm supports operations such as power supply switching control functions as discussed herein. For example, in one embodiment, the instructions, when executed by power supply control circuitry 140, cause the power supply control circuitry 140 to perform operations as in the flowcharts below.

Techniques herein are well suited for use in power supply applications. However, it should be noted that embodiments herein are not limited to use in such applications and that the techniques discussed herein are well suited for use in other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving a signal outputted from a PID control circuit in a power supply, the signal received from the PID control circuit being a non-linear control signal, the PID control circuit generating the signal based at least in part on monitoring of an error voltage of the power supply;
   implementing a signal shaping circuit to convert the signal received from the PID control circuit into a linear control signal; and
   utilizing the linear control signal generated by the signal shaping circuit as a control parameter to adjust a switching period of a power supply control signal.

2. The method as in claim 1 further comprising:
   switching between:
      controlling the signal shaping circuit to convert the non-linear control signal generated by the PID control circuit into the linear control signal during a non-transient condition in which a slope of the error voltage is below a slope threshold value; and
      controlling the signal shaping circuit to convert the linear control into a non-linear control signal during a transient condition in which a slope of the error voltage is above a slope threshold value.

3. The method as in claim 2, wherein controlling the signal shaping circuit to convert the signal generated by the PID control circuit into the non-linear control signal during the transient condition further comprises:
implementing a gain stage in the signal shaping circuit, the gain stage converting the linear control signal into the non-linear control signal.

4. The method as in claim 1, wherein a magnitude of the signal received from the PID control circuit is represented by a value of x; and
wherein implementing the signal shaping circuit to convert the signal received from the PID control circuit into the linear control signal comprises producing the linear control signal generated by the signal shaping circuit to be a magnitude of $x/(1+x)$.

5. The method as in claim 1 further comprising:
during a non-transient condition, operating the PID control circuit in a non-bypass mode in which both a D-component path and a P-component path of the PID control circuit include a primary filter that filters the error voltage; and
in response to detecting a transient condition based at least in part on a change in the error voltage, switching to operation of the PID control circuit in a bypass mode in which both the D-component path and the P-component path in the PID control circuit bypass the primary filter.

6. The method as in claim 1 further comprising:
operating the PID control circuit in a non-bypass mode in which both a D-component path and a P-component path of the PID control circuit include a primary filter that filters the error voltage; and
in response to detecting a transient condition based at least in part on a change in the error voltage, switching to operation of the PID control circuit in a bypass mode in which:
the D-component path includes an auxiliary filter to filter the error voltage instead of the primary filter, and
the P-component path bypasses the primary filter.

7. The method as in claim 1 further comprising:
monitoring the error voltage; and
adjusting a settings of a P-component gain coefficient and a D-component gain coefficient in the PID control circuit depending on a state of the error voltage.

8. The method as in claim 7, wherein adjusting the settings includes:
increasing a magnitude of both a setting of the P-component gain coefficient and a setting of the D-component gain coefficient in the PID control circuit in response to detecting an increase in a magnitude of the error voltage.

9. The method as in claim 1 further comprising:
maintaining a pulse width setting of the power supply control signal to be substantially constant while adjusting the switching period of the power supply control signal by an amount as specified by the linear control signal.

10. The method as in claim 1 further comprising:
storing a value indicating a desired switching frequency setting of the power supply control signal; and
during a non-transient load condition, adjusting a duty cycle of the power supply control signal to set the switching frequency of the power supply control signal to a value substantially equal to the desired switching frequency setting.

11. The method as in claim 1 further comprising:
in response to detecting a change in the error voltage, adjusting a bandwidth of filtering the error voltage in a P-component path in the PID control circuit.

12. The method as in claim 1 further comprising:
implementing a shaping function in the signal shaping circuit to convert the linear control signal into the non-linear control signal during a detected transient condition during which a slope of the error voltage is greater than a threshold value; and
utilizing the non-linear control signal to modify the switching period.

13. The method as in claim 1 further comprising:
implementing a multi-piece linear function to convert the signal received from the PID control circuit into the linear control signal.

14. A power supply system comprising:
a PID control circuit, the PID control circuit generating a non-linear control signal based at least in part on an error voltage of the power supply system;
a signal shaping circuit, the signal shaping circuit receiving the non-linear control signal outputted from the PID control circuit and converting the non-linear control signal into a linear control signal; and
a control signal generator, the control signal generator utilizing the linear control signal generated by the signal shaping circuit as a control parameter to adjust a switching period of a power supply control signal.

15. The power supply system as in claim 14 further comprising:
a monitor circuit that produces control signals to adjust setting of the PID control circuit depending on the error voltage, the monitor circuit switching between operating the PID control circuit in:
a non-bypass mode in which both a D-component path and a P-component path of the PID control circuit includes a primary filter that filters the error voltage; and
a bypass mode in which both the D-component path and the P-component path in the PID control circuit bypass the primary filter to provide a faster response.

16. The power supply system as in claim 15, wherein a magnitude of the non-linear control signal received by the signal shaping circuit from the PID control circuit is represented by a value of X; and
wherein the signal shaping circuit produces a value having a respective magnitude substantially equal to $X/(1+X)$ to adjust the switching period.

17. The power supply system as in claim 14 further comprising:
a monitor circuit to monitor the error voltage, the monitor circuit adjusting settings of a P-component gain coefficient and a D-component gain coefficient in the PID control circuit depending on a state of the error voltage.

18. The power supply system as in claim 14 further comprising:
a duty cycle control circuit that adjusts a pulse width of the power supply control signal, adjustment of the duty cycle control signal initiating a change in the switching frequency of the power supply control signal towards a desired switching frequency setting.

19. Computer-readable storage hardware having instructions stored thereon, the instructions, when carried out by a processing device, causes the processing device to perform operations of:
receiving a signal outputted from a PID control circuit in a power supply, the PID control circuit generating the signal based at least in part on monitoring of an error voltage of the power supply;

implementing a signal shaping circuit to convert the signal received from the PID control circuit into a linear control signal; and utilizing the linear control signal outputted from the signal shaping circuit as a control parameter to adjust a switching period of a power supply control signal.

20. The method as in claim 1 further comprising:

receiving the linear control signal; and wherein utilizing the linear control signal generated by the signal shaping circuit as a control parameter to adjust the switching period of the power supply control signal includes:

implementing a gain stage to receive the linear control signal and convert the received linear control signal into an output adjustment signal, the output adjustment signal modifying the switching period of the power supply control signal.

21. The method as in claim 1 further comprising:

implementing a monitor circuit to monitor the error voltage and detect transient current consumption and non-transient current consumption associated with a dynamic load powered by an output voltage of the power supply; and wherein utilizing the linear control signal generated by the signal shaping circuit as the control parameter to adjust the switching period of the power supply control signal further includes:

receiving a control signal from the monitor circuit, the control signal indicating occurrence of a transient current consumption condition in which the dynamic load powered by the output voltage consumes an increase in current;

in response to the transient current consumption condition, setting a magnitude of a gain stage that receives the linear control signal to a gain value greater than 1, setting of the gain stage to the gain value greater than 1 converting the linear control signal outputted from the signal shaping circuit to a non-linear output adjustment signal; and utilizing the non-linear output adjustment signal to adjust the switching period of the power supply control signal.

22. The method as in claim 21 further comprising:

subsequent to detecting the transient condition, detecting a non-transient current consumption condition in which the dynamic load consumes a steady state amount of current; and wherein utilizing the linear control signal generated by the signal shaping circuit as the control parameter to adjust the switching period of the power supply control signal further includes:

receiving a control signal from the monitor circuit, the control signal indicating occurrence of the non-transient current consumption condition;

in response to the non-transient current consumption condition, setting a magnitude of the gain stage to a gain value of 1, setting of the gain stage to the gain value of 1 causing the gain stage to output the received linear control signal as a linear output adjustment signal; and utilizing the linear output adjustment signal to adjust the switching period of the power supply control signal.

23. The method as in claim 1 further comprising:

implementing a shaping function in the signal shaping circuit to modify a gain applied to the linear control signal to produce an output adjustment signal, a magnitude of the gain selectively controlling conversion of the received linear control signal to a non-linear adjustment signal; and utilizing the non-linear adjustment signal to modify the switching period of the power supply control signal.

* * * * *